(12) United States Patent
Madsen Obel et al.

(10) Patent No.: US 10,439,475 B2
(45) Date of Patent: Oct. 8, 2019

(54) FAN COOLED DUAL-COMPARTMENT ELECTRONIC HOUSING FOR AN ELECTRIC MOTOR

(71) Applicant: GRUNDFOS HOLDING A/S, Bjerringbro (DK)

(72) Inventors: Palle Madsen Obel, Viborg (DK); Lars Østergaard, Randers NV (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 14/385,266

(22) PCT Filed: Feb. 19, 2013

(86) PCT No.: PCT/EP2013/053290
§ 371 (c)(1),
(2) Date: Sep. 15, 2014

(87) PCT Pub. No.: WO2013/135465
PCT Pub. Date: Sep. 19, 2013

(65) Prior Publication Data
US 2015/0076942 A1    Mar. 19, 2015

(30) Foreign Application Priority Data

Mar. 15, 2012 (EP) .................................... 12159623

(51) Int. Cl.
*H02K 9/06* (2006.01)
*H02K 5/18* (2006.01)
(Continued)

(52) U.S. Cl.
CPC ................. *H02K 9/06* (2013.01); *H02K 5/18* (2013.01); *H02K 11/01* (2016.01); *H02K 11/33* (2016.01)

(58) Field of Classification Search
CPC ........ H02K 5/18; H02K 5/20; H02K 11/0005; H02K 11/00; H02K 11/01; H02K 11/33; H02K 5/00; H02K 9/06
(Continued)

(56) References Cited

U.S. PATENT DOCUMENTS 5,763,969 A * 6/1998 Metheny ................ H02K 11/33
310/52
5,780,946 A * 7/1998 Nakamura ............ F04D 25/082
310/58

(Continued)

FOREIGN PATENT DOCUMENTS

| DE | 10 2010 017222 A1 | 12/2011 |
|----|-------------------|---------|
| JP | 11 234954 A | 8/1999 |
| JP | H 11-234954 * | 8/1999 |

OTHER PUBLICATIONS

English Translation of JPH 11-234954 (Aug. 1999).*

*Primary Examiner* — Julio C. Gonzalez
*Assistant Examiner* — Maged M Almawri
(74) *Attorney, Agent, or Firm* — McGlew and Tuttle, P.C.

(57) ABSTRACT

An electric motor with a stator housing (2) and with an electronics housing (8), has a first section (A) of the electronics housing arranged on the radial side of the stator housing (2), and a fan (24) arranged on a first axial end (22) of the stator housing (2). The electronics housing (8) extends in the axial direction (X) beyond the first axial end (22) of the stator housing in a manner such that a second section (B) of the electronics housing (8), in whose inside at least one first heat-producing electronic component (58, 60) is arranged, is situated on the radial side of the fan (24). A pump assembly with such an electric motor is also provided.

20 Claims, 8 Drawing Sheets

(51) Int. Cl.
*H02K 11/01* (2016.01)
*H02K 11/33* (2016.01)

(58) Field of Classification Search
USPC ............ 310/61, 71, 59, 60, 89, 12.29, 60 R
See application file for complete search history.

(56) References Cited

U.S. PATENT DOCUMENTS

| | | | | |
|---|---|---|---|---|
| 5,814,909 A * | 9/1998 | Yamada | ................ | H02K 11/33 310/52 |
| 5,939,807 A * | 8/1999 | Patyk | ................ | H02K 5/161 310/64 |
| 6,570,284 B1 * | 5/2003 | Agnes | ................ | H02K 1/185 310/156.01 |
| 6,707,185 B2 * | 3/2004 | Akutsu | ................ | B62D 5/0406 310/68 B |
| 7,781,926 B2 * | 8/2010 | Schmidt | ................ | H02K 5/06 310/77 |
| 2001/0033113 A1 * | 10/2001 | Takano | ................ | B62D 5/064 310/67 R |
| 2004/0032178 A1 * | 2/2004 | Raster | ................ | H02K 7/003 310/112 |
| 2005/0093382 A1 * | 5/2005 | Hirth | ................ | H02K 5/225 310/62 |
| 2006/0028075 A1 * | 2/2006 | Noda | ................ | H02K 5/10 310/64 |
| 2007/0152507 A1 * | 7/2007 | Lazzarato | ................ | H02J 9/062 307/66 |
| 2007/0284954 A1 * | 12/2007 | Lin | ................ | H02K 11/33 310/58 |
| 2009/0267432 A1 * | 10/2009 | Henry | ................ | H02K 5/225 310/71 |
| 2009/0289513 A1 * | 11/2009 | Vadillo | ................ | H02K 9/14 310/62 |
| 2011/0026227 A1 * | 2/2011 | Monster | ................ | H02K 11/022 361/710 |
| 2011/0123375 A1 * | 5/2011 | Ostergaard | ................ | H02K 11/21 417/423.8 |
| 2014/0140872 A1 * | 5/2014 | Stork | ................ | F04B 17/03 417/410.1 |

* cited by examiner

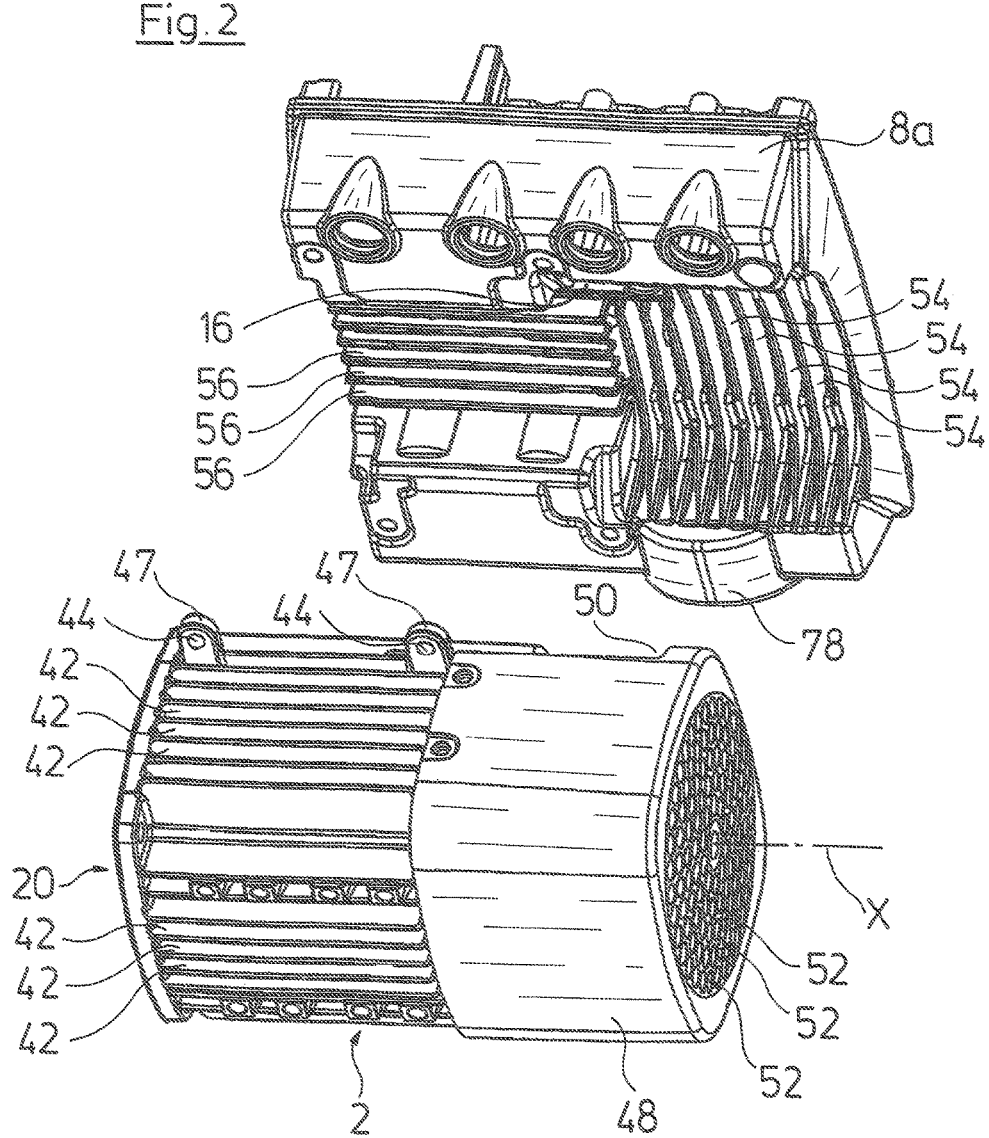

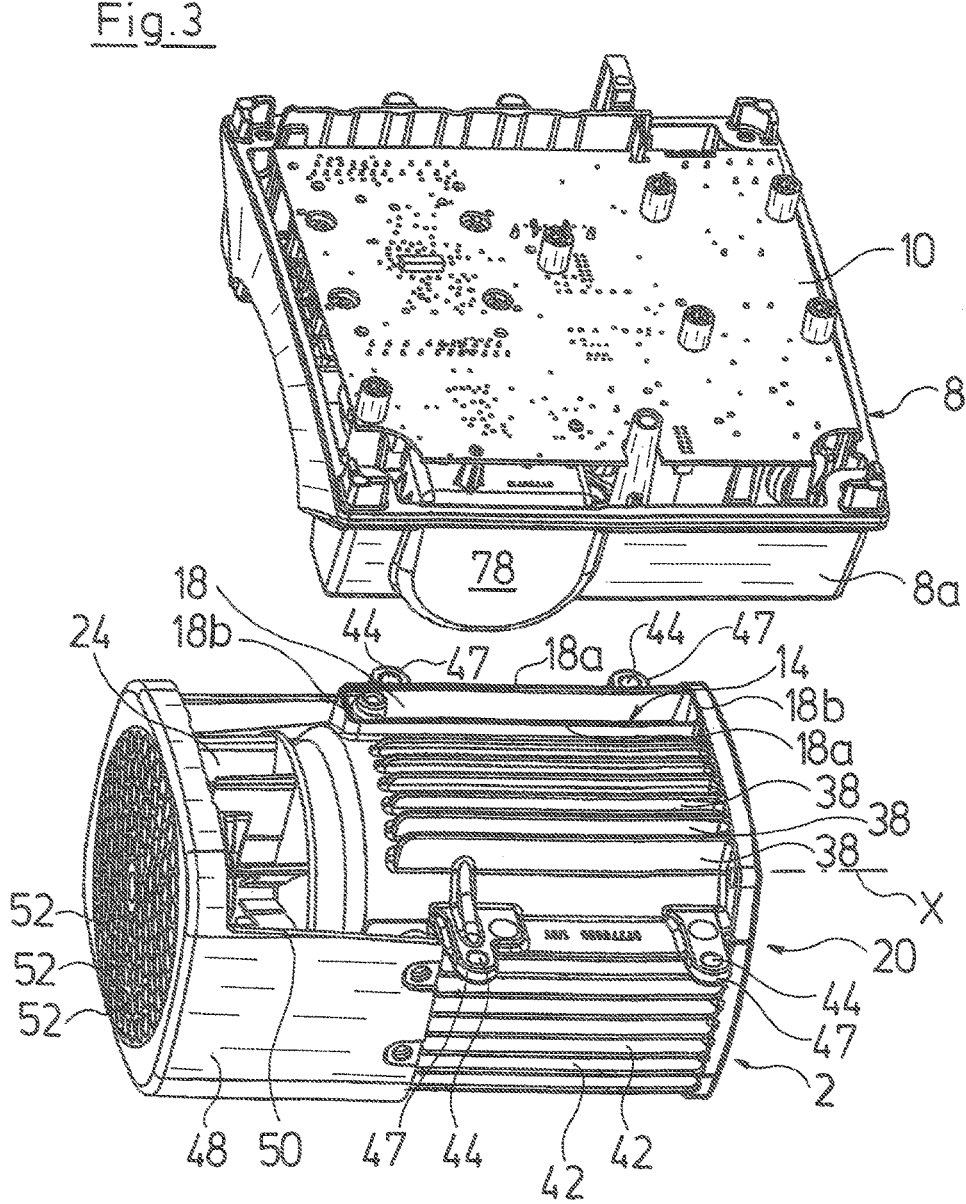

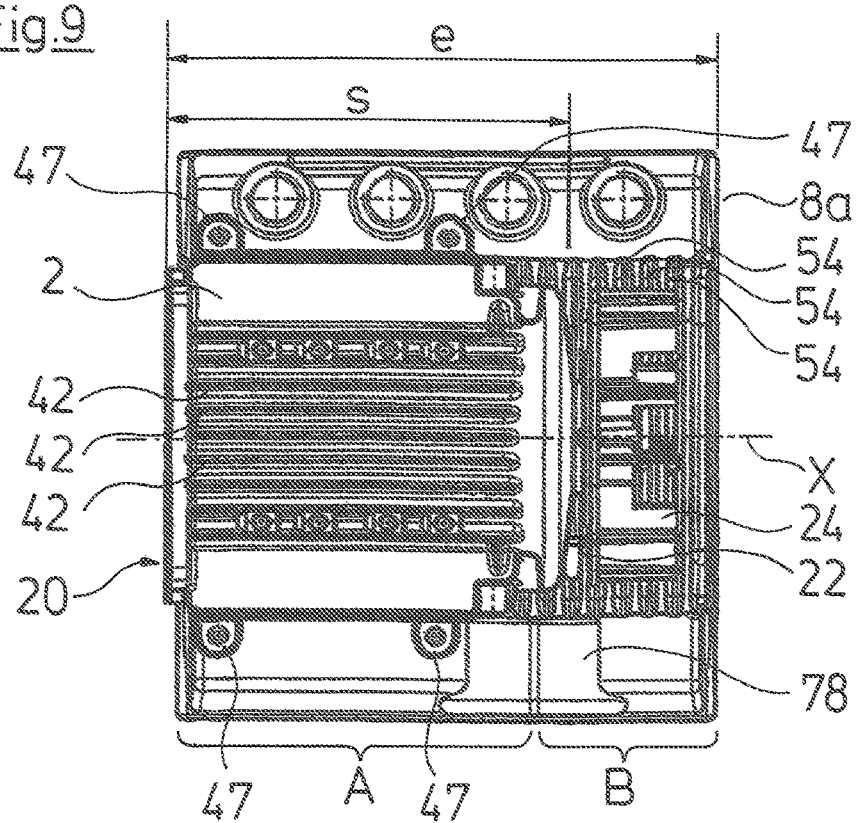
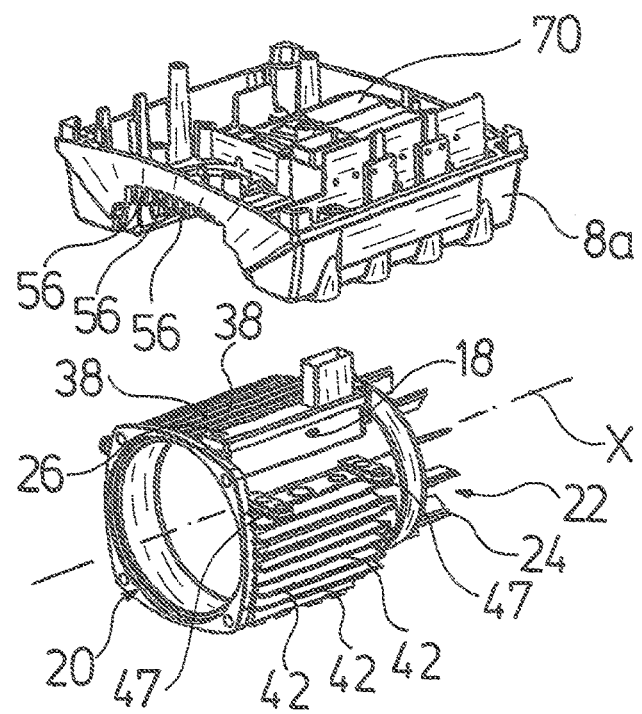

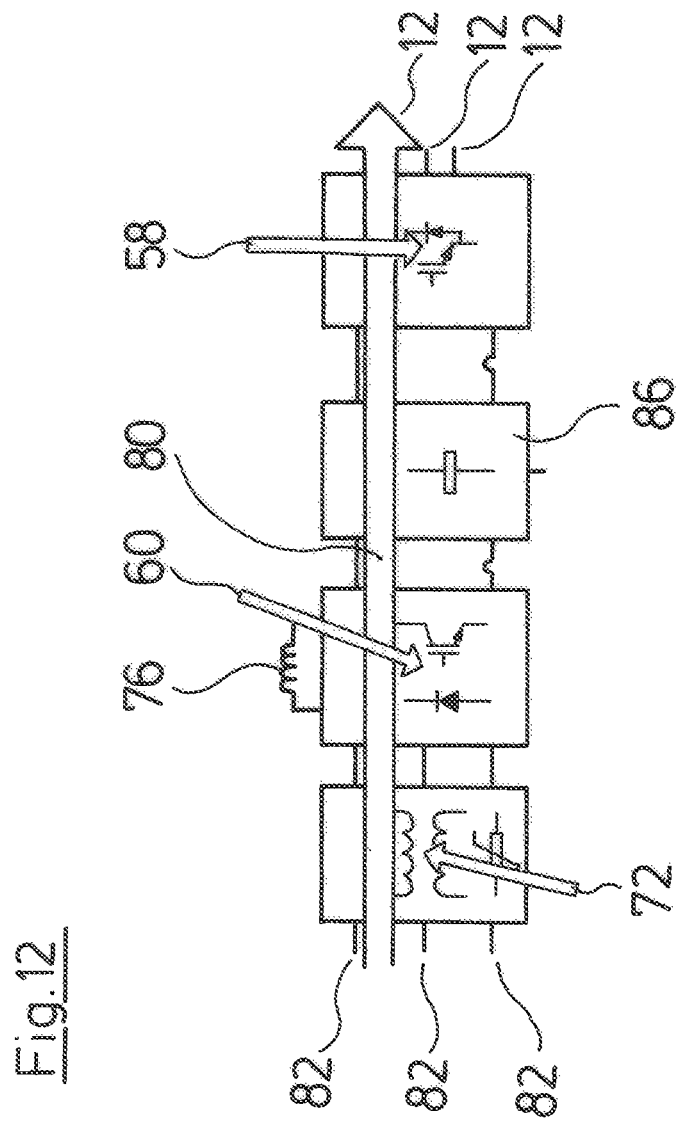

FAN COOLED DUAL-COMPARTMENT ELECTRONIC HOUSING FOR AN ELECTRIC MOTOR

CROSS REFERENCE TO RELATED APPLICATIONS

This application is a United States National Phase Application of International Application PCT/EP2013/053290 filed Feb. 19, 2013 and claims the benefit of priority under 35 U.S.C. § 119 of European Patent Application EP 12159623.3 filed Mar. 15, 2012, the entire contents of which are incorporated herein by reference.

FIELD OF THE INVENTION

The invention relates to an electric motor as well as to a pump assembly with such an electric motor as a drive motor.

BACKGROUND OF THE INVENTION

Electric motors as a rule comprise a stator housing and as a rule a terminal box or an electronics housing, in which electrical and in particular electronic components for controlling the electric motor are arranged. Thereby, it is known for such an electronics housing to be arranged on the peripheral side or radial side of the stator housing. Thereby, the electronics housing as a rule has a length which is shorter or equal to that of the stator housing. As a rule, a fan is arranged at a first axial end of the stator housing and this fan serves for cooling the electric motor, in order to lead away the waste heat which occurs in the stator housing and electronics housing. Cooling ribs can be formed on the electronics housing and/or on the stator housing, and an airflow, which is produced by the fan, flows over these cooling ribs in a cooling manner.

A large quantity of heat which is to be led away above all occurs in the electronics housing, in particular if a frequency converter is arranged in the electronics housing.

SUMMARY OF THE INVENTION

With regard to these problems, it is an object of the invention, to improve an electric motor to the extent that components arranged in an electronics housing can be better cooled.

According to the invention, an electric motor is provided with a stator housing and with an electronics housing. A first section of the electronics housing is arranged on the radial side of the stator housing. A fan is arranged on an axial end of the stator housing. The electronics housing extends in an axial direction beyond an axial end of the stator housing. On the axial end the fan is arranged in a manner such that a second section of the electronics housing, in an inside of which at least one first heat-producing electronic component is arranged, is situated on the radial side of the fan.

According to another aspect of the invention, a pump assembly is provided with a drive motor, wherein the drive motor is an electric motor according to the invention.

The electric motor according to the invention in the known manner comprises a stator housing and an electronics housing. Thereby, the electronics housing is attached on the outer side of the stator housing and contains electrical and electronic components for the connection and for the control of the electric motor. According to the invention, a first section of the electronics housing is arranged on the radial side of the stator housing, i.e. the first section of the electronics housing lies on the radial side or on a peripheral side of the stator housing with respect to the rotation axis of the electric motor. Moreover, in the known manner, a fan is arranged at an axial end of the stator housing. Preferably, the rotor shaft projects out of the stator housing at a first axial end or a first axial side of the stator housing, and the fan is arranged at an opposite second axial side of the stator housing.

According to the invention, apart from this first section, the electronics housing comprises at least one second section which is formed by a section of the electronics housing which extends in the axial direction beyond the axial end, i.e. the second axial side of the stator housing, at which the fan is situated. I.e. the electronics housing in the axial direction is designed longer than the stator housing, at least at this axial end. The second section which projects beyond the axial end of the stator housing thus lies on the radial side of the fan arranged at this axial end. In this second section, at least one first heat-producing component is arranged in the inside. The arrangement of the second section on the radial side of the fan and the arrangement of the first heat-producing component in this second section has the advantage that this region can be particularly well cooled by the fan, since the cooling airflow produced by the fan is directed directly in the radial direction onto this second section of the electronics housing. Inasmuch as this is concerned, an improved cooling of the electronic components in the inside of the electronics housing is achieved when these are arranged in the second section on the radial side of the fan. Preferably, the at least one heat-producing component in this second section is arranged in a heat-conducting manner directly on a housing wall, preferably directly on the inner side of a housing wall of the electronics housing which faces the fan.

Preferably, the fan and the second section of the electronics housing are designed and arranged relative to one another such that a cooling airflow produced by the fan flows over the mentioned second section of the electronics housing at its outer side, i.e. in particular the outer side facing the fan, in the tangential direction. I.e. the cooling airflow exiting radially from the fan is deflected in this region in the tangential or in the peripheral direction, so that in this direction it flows over the outer side of the second section of the electronics housing. Thus, the cooling of this region is improved even further. If the fan is surrounded to the outside by a cap or covering, moreover a peripheral airflow can be produced in this region and this flows along below the second section of the electronics housing and cools this particularly well. Particularly preferably, this airflow, departing from the free axial end of the fan, moves peripherally to the first axial end of the stator housing in a helical manner. The corresponding diversion or deflection of the airflow is achieved by the design of the outer side of the second section of the electronics housing and/or, as the case may be, of a cap which surrounds the fan.

According to a particular embodiment of the invention, only a first part airflow of the cooling airflow produced by the fan flows over an outer side of the second section of the electronics housing, whilst a second part airflow flows over an outer side of the first section of the electronics housing. This can be achieved by way of a suitable shaping of the outer side of the electronics housing and arrangement and shaping of a cap surrounding the fan. A division of the cooling airflow which is produced by the fan, into this first and second part airflow can be effected by these elements. Both regions, i.e. the first section and the second section of the electronics housing are optimally cooled in this manner.

According to a further preferred embodiment of the invention, a ribbing directed to the fan is formed on the second section of the electronics housing which is arranged on the radial side of the fan, on the outer side of a first wall section facing the fan. This ribbing can be designed in the shape of elongate ribs or for example also in the form of pins or differently shaped cooling ribs or cooling elements. Particularly preferably, the ribbing is shaped such that a deflection of the airflow impinging the wall section radially from the fan is effected in the tangential or peripheral direction in the region of this first wall section, so that the first wall section which forms an outer side of the second section of the electronics housing, is subjected to air flowing over it in the tangential direction.

Further preferably, cooling ribs are formed on the outer side of a first wall section facing the fan, on the second section of the electronics housing, and extend in the peripheral direction or tangential direction with respect to the rotation axis of the electric motor. These cooling ribs effect the described diversion or deflection of the airflow, so that a cooling airflow flows over the outer side of this wall section and thus an outer side of the second section of the electronics housing in this region in the tangential direction or in the peripheral direction. Particularly preferably, a rotating peripheral airflow is thus produced in this region in the peripheral region of the fan and this airflow flows over this first wall section, in a helical manner as the case may be, several times and thus contributes to an improved cooling.

The second wall section further preferably forms an axial extension of the first wall section. The first and the second wall section preferably together form a lower side of the electronics housing which faces the stator housing and the fan. The first wall section and the second wall section are thereby preferably formed as one piece or as one part.

Further preferably, the first section of the electronics housing on the outer side of a second wall section facing the peripheral surface of the stator housing comprises cooling ribs which extend parallel to the rotation axis of the electric motor. I.e. these cooling ribs are preferably aligned in the axial direction, in which a cooling airflow is led along the second wall section. This, as described above, can either be a part airflow or however also at least a part of the airflow which previously flowed over the first section of the electronics housing or its first wall section in the tangential or peripheral direction. A deflection of the cooling airflow in the axial direction can therefore occur in the transition of the first to the second wall section. The at least one first heat-producing component is usefully arranged on an inner side of the wall section facing the fan, in the inside of the second section. Particularly preferably, a direct heat-conducting connection between the component and the inner side of the wall section is created, as the case may be amid the use of a thermally conductive medium, in order to create an optimal heat transfer.

The at least one heat-producing electronic component is particularly preferably that component in the inside of the electronics housing, which produces most heat. It is advantageous to place this component in the second section directly on the radial side of the fan, since with this arrangement, this is the region of the electronics housing which is best cooled by the direct onflow of the fan.

With regard to the at least one first heat-producing electronic component, it is further preferably the case of parts of a frequency converter, in particular of a rectifier and/or inverter of a frequency converter. These components contain power switches and as a rule produce significant waste heat, indeed with a large power of the electric motor.

Further preferably, at least one second heat-producing electronic component is arranged on an inner side of the second wall section facing the stator housing, in the first section of the electronics housing. In this region too, a particularly pronounced cooling effect is yet achieved by an axially directed airflow along the second wall section facing the stator housing. Inasmuch as this is concerned, electronic components in the inside of the electronics housing and which produce waste heat can also be optimally arranged and cooled in this region. The second heat-producing electronic component is thereby preferably arranged in a heat-conducting connection on the inner side of the wall section facing the stator housing. Here too, a thermally conductive medium can be arranged or attached between the electronic component and the inner side of the wall section as the case may be, in order to improve the heat transfer.

According to a further preferred embodiment of the invention a pocket, in whose inside a second heat-producing component is arranged, can be formed in the second section of the electronics housing, i.e. that section of the electronics housing which projects beyond the stator housing on the axial side, and this pocket is arranged in a manner such that the pocket at its outer side is subjected to onflow by a tangentially directed cooling airflow. The pocket thereby preferably projects outwards beyond the remaining outer contour of the electronics housing, so that it forms an additional outer surface which can be subjected to onflow by the cooling air. Preferably, a coil of the frequency converter is arranged in the pocket. Thereby, the pocket with regard to its shape is preferably adapted to the shape of the electronic component, in particular of the coil, so that the electronic component on the inner side of the pocket bears in an as large-surfaced as possible manner on the wall of the pocket, so that an optimal heat transfer is achieved in this region. The pocket is arranged on the second section such that the tangentially directed cooling airflow which flows over an outer side or a first wall section of the second section in the tangential direction flows directly on or over the outer side or an outer side of a wall of the pocket. This region is thus also directly subjected to onflow by the cooling airflow exiting the fan, and is optimally cooled.

Usefully, at least the first wall section of the electronics housing which faces the fan and/or the second wall section of the electronics housing which faces the stator housing are formed from metal. Both parts can, for example, be manufactured as one piece as cast components, for example, of aluminum. The previously described pocket is preferably designed as one piece with the first wall section of the electronics housing which faces the fan, preferably likewise cast from metal. The design of the wall sections of the electronics housing from metal, which wall sections are to be cooled, has the advantage that a large thermal conductivity of the electronics housing or the wall of the electronics housing is given in these regions. Moreover, the complex shaping with the design of the above described cooling ribs can be produced in a favorable manner with metal casting, for example with die casting.

The first wall section facing the fan and the second section facing the stator housing are preferably manufactured as one piece. The previously described pocket is preferably also manufactured as one piece with these wall sections. Particularly preferably, the electronics housing is designed of two parts with a lower part and a cover, wherein the first and the second wall section are part of the lower part and the complete lower part is designed as one piece, in particular as a cast component of metal.

According to a further preferred embodiment, an electromagnetic shielding can be arranged in the inside of the electronics housing between two regions of the interior of the electronics housing. This can be designed in the form of a separating wall. Such a separating wall can be cast of metal as one piece with the further wall sections, in particular with a complete lower part of the electronics housing. In particular, the shielding is preferably cast as one piece with a second wall section which is situated on the radial side of the stator housing. The wall serves for shielding the components which cause strong electromagnetic interferences, with respect to the other electronic components in the inside of the electronics housing. Such a component is a common mode choke of a frequency converter for example, and this is preferably arranged in an electromagnetically shielded region of the electronics housing.

Further preferably, mechanical and/or electrical connection elements are arranged between the stator housing and the electronics housing in a manner such that they are situated laterally of a cooling airflow between the stator and the electronics housing. The electronics housing is preferably arranged radially distanced to the outer wall of the stator housing, so that a free space remains between the stator and the electronics housing, through which free space a cooling airflow flows. This free space on the side of the electronics housing is delimited by the second wall section of the electronics housing which is described above. Preferably, cooling ribs extending in the axial direction, i.e. parallel to the rotation axis of the electric motor, are formed on this wall section. Cooling ribs likewise directed in the axial direction can be formed on the oppositely lying outer side of the stator housing. The mentioned mechanical connection elements which fix the electronics housing on the stator housing are thereby preferably placed laterally of the region, in which the cooling ribs for guiding the axially directed cooling airflow are arranged, so that these connection elements, for example bolts or screws, are not situated in the cooling airflow between the electronics housing and the stator housing and thus cannot interrupt this cooling airflow.

Alternatively or additionally, preferably, an electrical connection element is also arranged between the electronics housing and the stator housing, so that it is situated outside the described cooling airflow or at a side of the free space between the electronics housing and the stator housing, through which free space the axially directed cooling airflow flows. This connection element can, for example, be a cable channel, through which electrical connection leads between the stator and electronic components in the inside of the electronics housing are led. Such a cable channel extends preferably in the axial direction, and is situated laterally or at a side of a cooling rib arrangement, through which the described axially directed cooling airflow is led between the stator housing and the electronics housing. Thus, the cable channel delimits the cooling airflow laterally and can likewise yet assume the function of a cooling rib.

The previously described electric motor is preferably applied as a drive motor for a pump assembly. Inasmuch as this is concerned, a pump assembly with an electric motor according to the preceding description as a drive motor is also the subject matter of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a view of the electric motor according to FIG. 1 with an electronics housing separated from the stator housing;

FIG. 3 is a perspective view of the arrangement according to FIG. 2 seen from the upper side of the electronics housing;

FIG. 8 is a perspective exploded view showing the stator housing according to FIG. 7 with the lower part of the electronics housing not yet put on;

FIG. 9 is a view from below the stator housing, with the electronics housing put on;

FIG. 12 is a block diagram of the important electrical components in the electronics housing.

DESCRIPTION OF THE PREFERRED EMBODIMENTS

Figure 1:
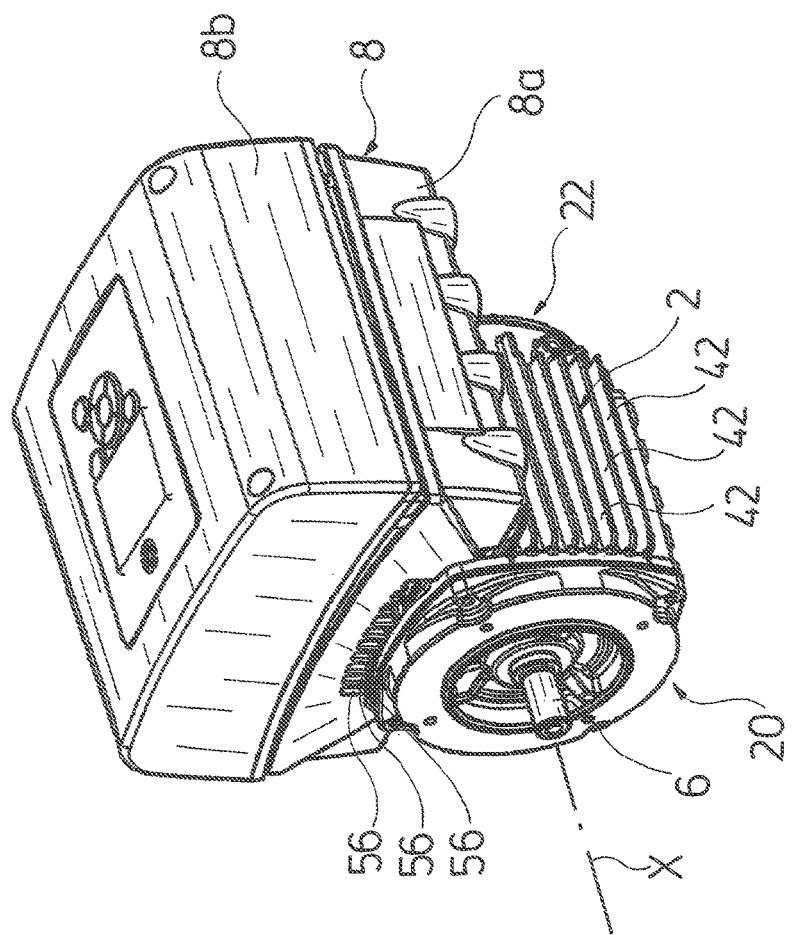
FIG. 1 is a perspective entire view of an electric motor according to the invention.
Figure 5:
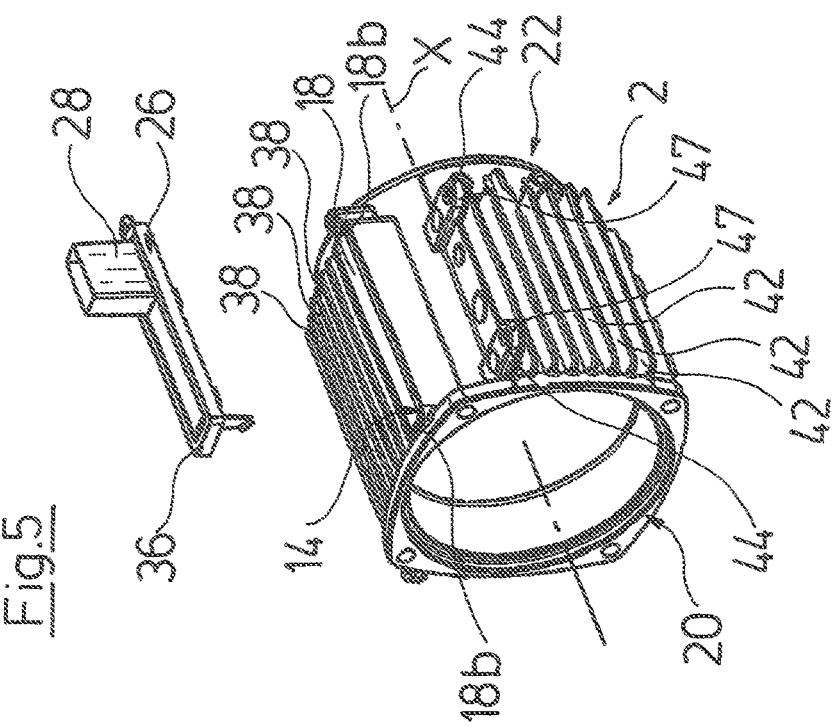
FIG. 5 is a perspective view of the stator housing with a removed cover of a cable channel.

Referring to the drawings in particular, the electric motor according to the invention which is shown in the figures, comprises a stator housing 2, in which a stator 4 with a rotor rotatable in its inside with a rotor shaft 6 is arranged. The rotor shaft 6 projects in the direction of the rotation axis X out of the stator housing 2 for the connection to external components, for example a pump assembly. An electronics housing 8 is arranged on the outer periphery of the stator housing 2 on the radial side with respect to the rotation axis X. The electronics housing 8 is formed from two parts, a lower part 8*a* and a cover 8*b*. The lower part 8*a* is applied with its lower side to the peripheral side of the stator housing 2. The upper side of the lower part 8*a* which is away from the stator housing 2 is closed by the cover 8*b*. The stator housing 2 and the lower part 8*a* of the electronics housing 8 and preferably also the cover 8*b* of the electronics housing are preferably manufactured of metal, for example die cast aluminum.

Figure 7:
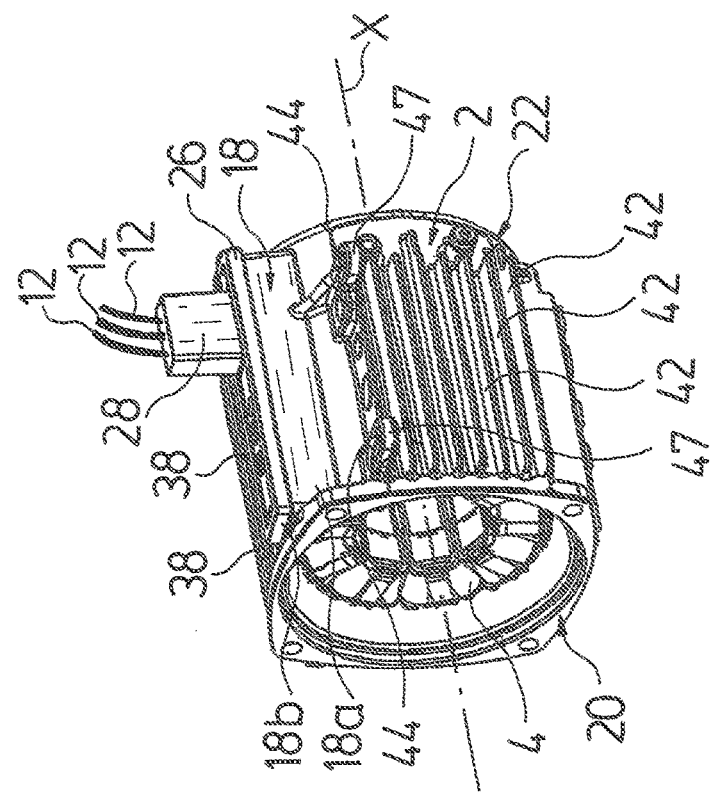
FIG. 7 is a perspective view showing the stator housing according to FIG. 6 with a cover placed on the cable channel.

Since the electronics housing 8 and the stator housing 2 represent two separate components, an electrical connection between the stator 4 in the inside of the stator housing 2 and the electronic components, for example the circuit board 10 in the inside of the electronics housing 8, is necessary. With the solution according to the invention shown here, this connection is effected by electrical connection leads 12 (see FIGS. 6 and 7). The stator housing 2 on its peripheral wall comprises a radially directed opening 14 which forms a first opening 14, through which the electrical connection leads 12 are led, in order to be able to lead the electrical connection leads 12 from the inside of the stator housing 2 to the outside. The lower part 8a of the electronics housing 8 comprises a second opening 16, through which electrical connection leads 12 extend into the inside of the electronics housing 8.

The first opening 14 in the stator housing 2 and the second opening 16 in the lower part 8a of the electronics housing 8 are arranged offset or distanced to one another in the axial direction X, i.e. in the direction of the rotation axis X. The openings 14 and 16 are thereby connected by way of a connection channel in the form of a cable channel 18, which is formed between the stator housing 2 and the electronics housing 8. The cable channel 18 is formed by two side walls 18a which extend parallel to the longitudinal axis or rotation axis X and seen in the axial direction X are connected at their face-ends in each case by way of an end-wall 18b. The side walls 18a and the end-walls 18b thus form a frame which extends from the outer periphery of the stator housing 2 to the electronics housing 8. The side walls 18a are thereby designed in the form of ribs which extend essentially in the radial direction or tangential direction away from the outer periphery of the stator housing 2 and towards the lower part 8a of the electronics housing 8. Thereby, the side walls 18a and the end-walls 18b are formed as one piece with the stator housing 2 of metal. The cable channel 18 which is thus formed on the outer periphery of the stator housing 2, thus forms a channel open to the electronics housing 8. The first opening 14 runs out into the cable channel 18 at an axial end. This is that axial end which faces the open axial side 20 of the stator housing. This is the first axial side 20, at which the rotor shaft 6 extends outwards and through which the stator 4 is inserted into the stator housing 2. At the opposite second axial side 22, a fan 24 connected to the rotor shaft 6 is arranged on the outer side of the stator housing 2. The arrangement of the first opening 14 as close as possible to the first axial side 20, through which the stator 4 is inserted into the stator housing 2, has the advantage that the electrical connection leads 12 can be easily led through the opening 14 to the outside, i.e. into the inside of the cable channel 18, on inserting the stator 4.

Figure 4:
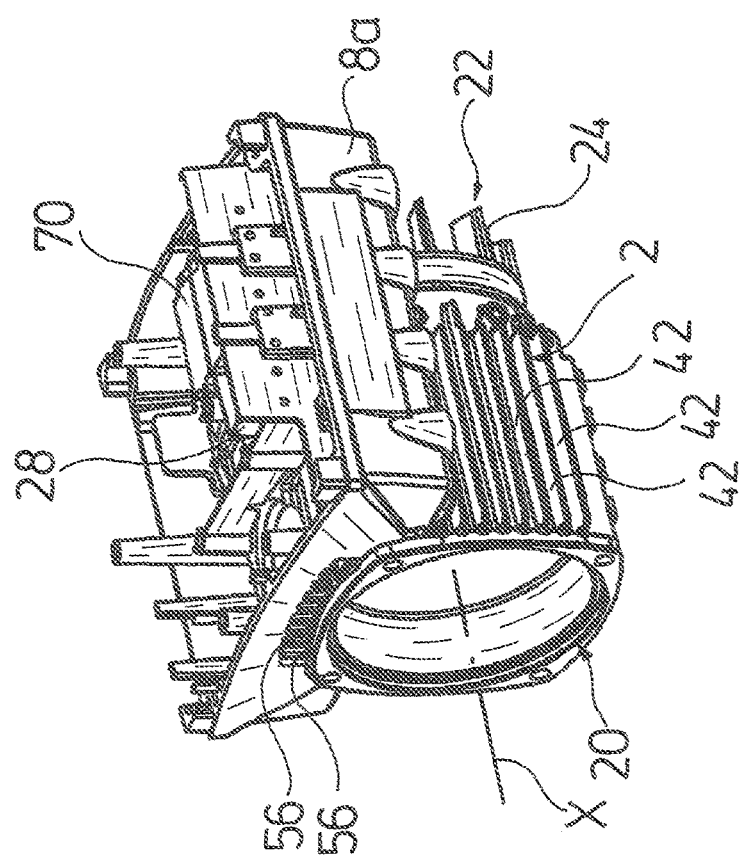
FIG. 4 is a perspective view of the stator housing with an attached lower part of an electronics housing.

The second opening 16 which is formed in the lower part 8a of the electronics housing 8 in an outer wall facing the stator housing 2, is situated such that when the electronics housing 8 is connected to the stator housing 2, it likewise lies opposite the cable channel 18 but in the vicinity of the axial end of the cable channel 18 which faces the second axial side 22 of the stator housing 2. The cable channel 18 which is open to the electronics housing 8 is closed by a cover 26 after insertion of the electrical connection leads 12. The cover 26, lying opposite the second opening 16, i.e. at its axial end facing the second axial side 22 of the stator 2, comprises a tube section 28 which is open to the inside of the cable channel 18 and extends away from the cable channel 18. The tube section 28 here has a rectangular cross section, but can, as the case may be, also have a different cross-sectional shape. Thereby, the cross-sectional shape of the tube section 28 is preferably adapted to the shape of the second opening 16 which in this embodiment example is likewise rectangular. The tube section 28 has an outer cross-sectional shape or size which is slightly smaller than the cross section of the second opening 16. Moreover, the tube section 28 which departing from the cable channel 18 extends to the lower side of the lower part 8a of the electronics housing, has such a length that when the lower part 8a of the electronics housing 8 is fastened on the stator housing 2, it projects through the opening 16 into the inside of the electronics housing 8, as can be recognized for example in FIG. 4.

The cover 26 is fixed on the cable channel 18 in this embodiment example by a locking element 30 as well as a screw 32. The cover 26 at its outer periphery lies on the free end-edge of the side walls 18a and of the end-walls 18b of the cable channel 18 in a sealing manner. Simultaneously, the cover 26 with its upper side which is away from the cable channel comes to sealingly bear on a rectangular frame-like bearing-contact surface 34 on the lower part 8a, when the electronics housing 8 is put on. The bearing-contact surface 34 is formed on the wall or lower side of the lower part 8a, which faces the stator housing 2 and has a shape which corresponds to the contour formed by the side walls 18a and the end-walls 18b of the cable channel 18. The bearing-contact surface 34 is preferably integrally formed directly on the lower part 18a. The second opening 16 lies in the inside of this frame-like bearing-contact surface 34.

Either the complete cover is formed from a suitably elastic material, preferably of an elastic plastic material or only at its outer periphery has an elastic bead 36 which for example of an elastomer material is directly cast onto the remaining part of the cover, so that the cover 26 can simultaneously function as a seal which seals the cable channel 18 between the stator housing 2 and the electronics housing 8 to the outside.

Figure 6:
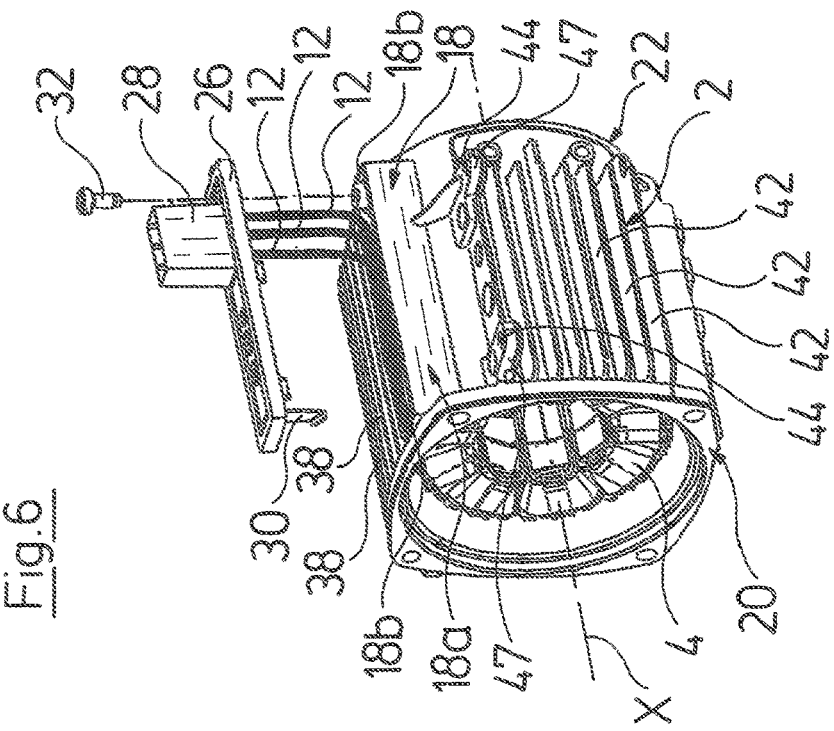
FIG. 6 is a perspective view showing the stator housing according to FIG. 5 with an inserted stator.
Figure 10:
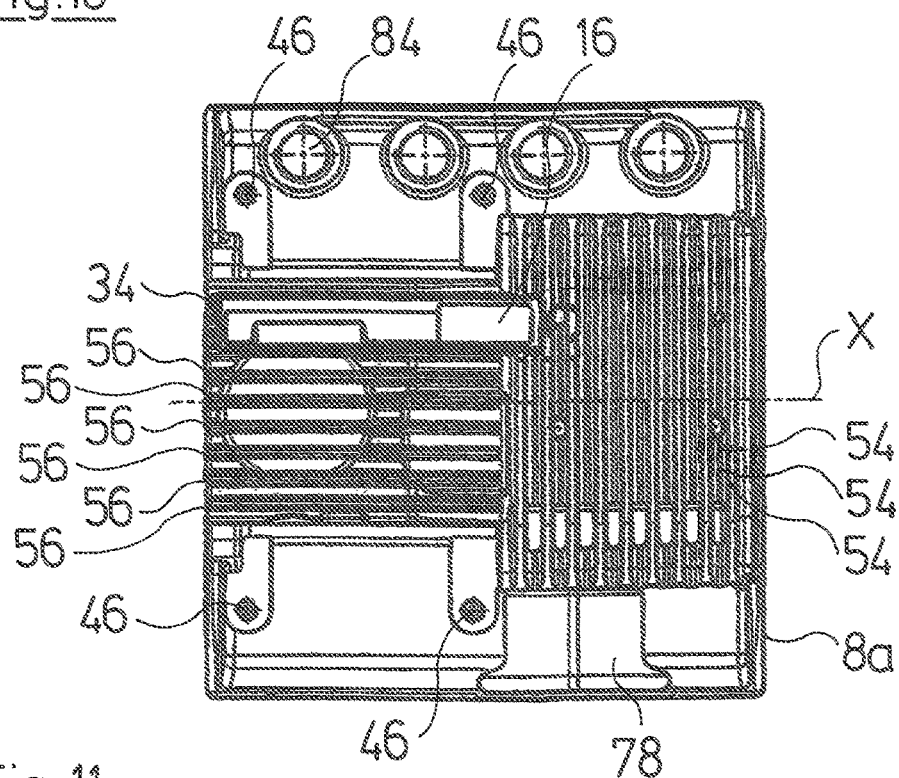
FIG. 10 is a plan view of the lower side of the electronics housing, with a removed stator housing.

After the connection leads 12 have been applied into the cable channel 18 as is shown in FIG. 6, the cover 26 is put on and is fixed by way of the locking element 30 and the screw 32, wherein the connection leads 12 are led to the outside through the tube section 28. Subsequently, the lower part 8a of the electronics housing 8 is fastened on the stator housing 2 in the manner described further below, wherein the electronic connection leads 12 are led through the opening 16 into the inside of the electronics housing 8, and the pipe section 28 engages into the opening 16 and projects into the inside of the electronics housing 8.

If the cable channel 18 with its side walls 18a and the end-walls 18b is designed completely of metal and is also closed at its upper side by the metallic lower part 8a of the electronics housing 8, the walls of the cable channel 18 are designed completely of metal and thus form a shielding for the electric connection leads 12. This is particularly important since a frequency converter is arranged in the electronics housing 8 and activates the motor or the stator 4. The output signals of the frequency converter, which are transmitted via the electrical connection leads 12, can produce electromagnetic interference signals which are thus shielded to the outside by way of the metallic walls of the cable channel 18.

An arrangement of cooling ribs 38 is formed on the outer side of the stator housing 2 which faces the electronics housing 8.

The side walls 18a of the cable channel 18 extend in the axial direction parallel to the cooling ribs 38. The cooling ribs 38 extend parallel to the longitudinal or rotation axis X and parallel to one another. I.e. the middle cooling ribs extend essentially radially to the longitudinal axis X away from the peripheral wall of the stator housing 2, whilst the outer cooling ribs extend parallel to this, likewise essentially radially and tangentially. The cooling ribs 38 departing from the stator housing 2, extend towards the electronics housing 8. The electronics housing 8 is arranged distanced to the outer side of the stator housing 2, so that a free space remains between the stator housing 2 and the electronics housing 8, in which space the cooling ribs 38 on the stator housing 2 as well as oppositely lying cooling ribs 56 are situated, which are formed on the wall of the lower part 8a of the electronics housing 8, said wall facing the stator housing 2. The cable channel 18 is situated on one side of the arrangement of cooling ribs 38. The cooling ribs 38 as well as the side walls 18a of the cable channel 18 are designed of metal as one piece with the stator housing 2. Due to the fact that the cable channel 18 is situated on the side of the arrangement of cooling ribs 38 and otherwise extends parallel to the cooling ribs 38, the cable channel 18 essentially does not compromise the cooling airflow through the arrangement of cooling ribs 38. Rather, the side walls 18a of the cable channel 18 also have the effect of cooling ribs and thus support the cooling of the stator housing 2 at the side which faces the terminal box or electronics housing 8. Further, cooling ribs 42 are arranged in the known manner on the remaining peripheral or side surfaces of the stator housing 2.

The fastening of the electronics housing 8 on the stator housing 2 is effected by way of screws which engage through fastening recesses 44 from below into the lower part of the electronics housing 8. For this, threaded holes 46 are formed on the lower part of the electronics housing. The fastening recesses or fastening holes 44 are formed in lugs 47 extending laterally away from the stator housing 2. Thus the fastening points, at which the electronics housing 8 is connected to the stator housing 2, are situated laterally and outside the arrangement of cooling ribs 38. Thus, the cooling airflow between the electronics housing 8 and the stator housing 2 is not compromised by these fastening elements, since the screws which extend through the fastening recesses 44 into the threaded holes 36 are situated outside this cooling airflow.

As can be particularly recognized in FIG. 9, the stator housing 2 has an axial length which is smaller than the axial length of the electronics housing 8. The electronics housing 8 thus projects beyond the axial side 22 of the stator housing 2 in the axial direction. The electronics housing 8 thus comprises two sections A and B, wherein a first section A of the electronics housing 8 is situated on the radial side of the stator housing 2. The section B is that section of the electronics housing which projects beyond the stator housing 2 in the axial direction. The section B is thereby situated on the radial side of the fan 24 which is situated on the axial side of the second axial side 22 of the stator housing 2.

The fan 24 is surrounded by a covering in the form of a cover flap 48. The cover flap 48 connects to the outer peripheral surface of the stator housing 2 and is designed in a closed manner on its peripheral side. A recess 50 is only formed on the peripheral side facing the electronics housing 8. Air entry openings 52 are formed on the axial side of the cover flap 48 which are away from the stator housing. The fan 24, which is driven by the rotor shaft 6, sucks air through the air entry openings 52 in the axial direction and presses this air in the radial direction into the peripheral region of the fan 24, radially against the inner side of the cap 28. Thereby, the air is deflected such that it is led into the free spaces between the cooling ribs 42 and thus exits at the axial side in the peripheral region of the stator housing 2 and flows along the cooling ribs 42.

In the region of the recess 50, the air exits from the fan 24 in the radial direction against the lower side of the lower part 8a of the electronics housing 8. This is the lower side of the section B of the electronics housing 8. The lower side forms a first wall section, on which cooling ribs 54 extending in the tangential direction or peripheral direction with respect to the rotation axis X are formed. A radially exiting cooling airflow as well as possible tangential cooling airflow components which exit from the fan 24 thus in this region firstly flow in the peripheral direction along the cooling ribs 54. In this region, the cooling air moreover enters into the gap between the electronics housing 8 and the stator housing 2, in which the cooling ribs 38 are situated on the outer side of the stator housing 2 which faces the electronics housing 8. This gap is thus situated between the first section A of the electronics housing 8 and the stator housing 2. Cooling ribs 56 which extend in the axial direction parallel to the rotation axis X are formed in this section A on the lower side of the lower part 8a of the electronics housing 8, said lower part forming the second wall. The cooling ribs 56, departing from the lower side of the lower part 8a of the electronics housing 8 extend in the direction of the stator housing 2. Thereby, the cooling ribs 56 are opposed to the cooling ribs 38 on the side of the stator housing 2 and preferably arranged lying opposite them. The cooling airflow thus flows in this region of the cooling ribs 38 and the cooling ribs 56 axially through the free space between the first section A of the electronics housing 8 and the stator housing 2 and exits from this gap at the first axial side 20 of the stator housing 2.

The cooling ribs 54 and 56 on the lower side or outer side of the electronics housing 8, which faces the stator housing 2 serve for the cooling of the electronics housing and thus of the electronic components arranged in the inside of the electronics housing. Thereby, the electronic components which produce the most waste heat, are situated on the inner side of the lower part 8a of the electronics housing 8 in the second section B which is situated on the radial side of the fan 24 and is provided on its outer side with the cooling ribs 54 which extend in the peripheral direction or tangential direction. The electronic components which produce the most waste heat are an inverter 58 as well as a rectifier 60 of a frequency converter which are arranged in the electronics housing 8. The inverter 58 contains the power switches of the frequency converter and is that component which together with the rectifier 60 produces most waste heat. The inverter 58 and the rectifier 60 bear on bearing-contact surfaces 70 on the inner side of the metallic lower part 8a of the electronics housing 8 in a thermally conductive manner. For this additional thermally conductive connection such as for example by way of thermally conductive adhesives or other thermally conductive substances, can be created between the bearing-contact surface 70 and the inverter 58 as well as the rectifier 60.

That electronic component which produces the second most waste heat in the inside of the electronics housing 8, in this example is a coil 72 which serves as a choke coil (CMC, common mode choke). This component in the first section A is arranged above the cooling ribs 56 on the inner side of the lower part 8a of the electronics housing. The coil 72 is also heat-conductively connected to the inner surface of the lower side of the lower part 8a of the electronics housing 8. Due to the fact that the inverter 58 and the rectifier 60 are situated in the second section B over the cooling ribs 54 directed in the peripheral direction, these are cooled the most by the cooling airflow which is directed in the radial direction, is deflected by the cooling ribs 54 in the peripheral direction and exits directly from the fan 24. The air then flowing in the further flow course through the cooling ribs 56 then cools the region, in which that electronic component producing the second most waste heat is situated, specifically the coil 72 so that this is also optimally cooled.

A metallic separating wall 74 which serves for the electromagnetic shielding is situated between the region of the electronics housing 8, in which the coil 72 is situated, and the remaining interior of the lower part of the electronics housing 8.

A further electronic component which produces waste heat, specifically the coil 76, is situated in a lateral pocket 78 which is formed in the lower part 8a of the electronics housing 8. The coil 76 is a power factor correction coil. This component also produces waste heat. The pocket 78 on the outer side of the electronics housing 8 is formed in the region of the electronics housing 8 which projects beyond the stator housing 2 in the radial direction, in order to be able to optimally cool this component. As is to be recognized in FIG. 9, the pocket 78 lies at the end side of the cooling ribs 54 in the region of the section B or directly adjacent the section B of the electronics housing 8. On account of cooling ribs 54 which are directed peripherally or tangentially to the rotation axis X, a tangentially directed cooling airflow is produced in this region, which thus flows directly on the outer wall of the pocket 78, so that this region is also particularly preferably cooled. The pocket 78 is adapted to the outer shape of the coil 76 so that an as large-surfaced as possible heat transfer from the coil 76 to the wall of the pocket 78 and this the outer wall of the electronics housing 8 or of the lower part 8a of the electronics housing 8 is achieved in this region.

Figure 11:
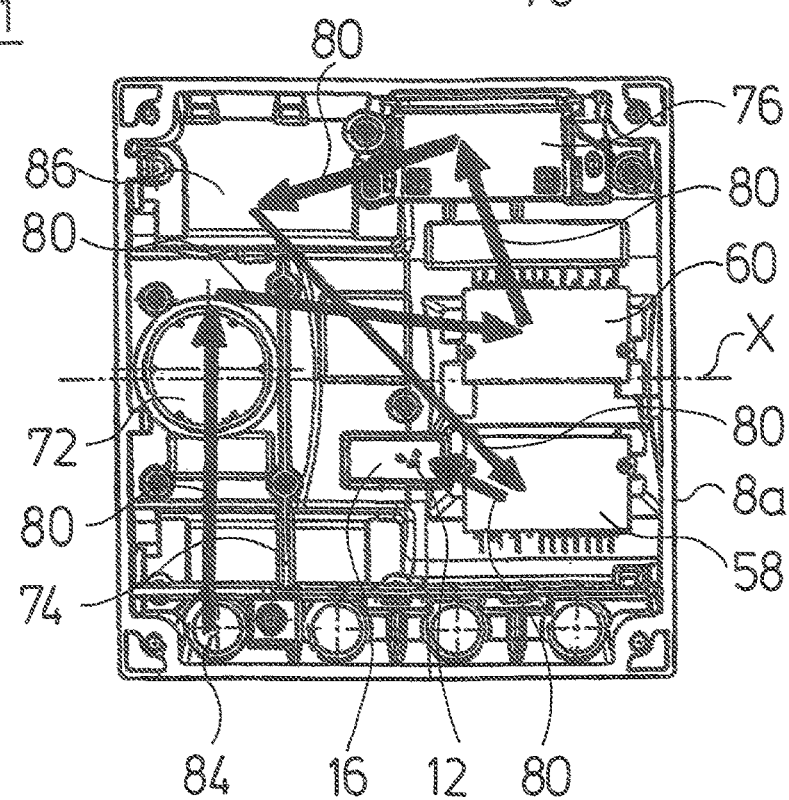
FIG. 11 is a plan view of the lower part of the electronics housing from its inner side.

It is once again explained by way of FIGS. 11 and 12, as to how the essential electronic components of the frequency converter which are arranged in the lower part 8a of the electronics housing 8 cooperate. The power flux between the individual components are characterized by arrows 80 in FIG. 11 and FIG. 12. The electrical power goes through a mains connection lead 82, which is led through the cable feed-through 84 into the inside of the electronics housing 8, into the electrical circuit of the frequency converter. The first essential component in the power flux 80 is the coil 72. From there, the power flux 80 goes into the rectifier 60 and the associated coil 76 which serves for power factor correction. In the power flux 80, the next essential component is a capacitor 86 which is situated in the side part of the electronics housing 8, in which the coil 76 is also arranged. The capacitor 86 lies next to the coil 76 seen in the axial direction. From there, the power flux goes to the inverter 58 and from there into the electrical connection leads 12 which lead through the opening 16 to the stator 2.

An optimal heat management for the heat-producing components in the inside of the electronics housing 8 is produced by the previously described design of the lower part 8a of the electronics housing 8. Thereby, particular importance is placed on the angled alignment of the cooling ribs 56 and 54 on the lower side of the lower part 8a of the electronics housing 8, said lower side facing the stator housing 2. The wall sections, on which the cooling ribs 54 and 56 are formed, thereby connect onto one another in the axial direction and are designed as one piece. Thus, all thermally conductive components can be designed very simply as one piece with the complete lower part 8a as a cast component. In the example shown here, the cooling ribs 54 and 56 are designed as one piece with the lower part 8a of the electronics housing 8. Instead of this design, the lower part 8a of the electronics housing can in each case comprise a recess in the region of the cooling ribs 54 and/or in the region of the cooling ribs 56, into which recess a heat distributor is inserted, on which the cooling ribs 54 and/or 56 are formed. Such a heat distributor in the inside of the electronics housing 8 in the region of the cooling ribs 56 could then be connected to the coil 72 or in the region of the cooling ribs 54 to the inverter 58 and/or to the rectifier 60, in a thermally conductive manner. Thereby, such a heat distributor inserted in a recess can only for the region of the cooling ribs 54 could additionally or alternatively also be designed for the region of the cooling ribs 56. If the cooling ribs 54 as well as the cooling ribs 56 are arranged on a heat distributor, then several separate heat distributors or also a common heat distributor can be applied for this. Such a heat distributor can be designed of metal and be applied in particular if the lower part 8a of the electronics housing 8 is formed from plastic.

While specific embodiments of the invention have been shown and described in detail to illustrate the application of the principles of the invention, it will be understood that the invention may be embodied otherwise without departing from such principles.

The invention claimed is:

1. An electric motor comprising:
   a stator housing comprising a stator housing axial end and a longitudinal axis;
   an electronics housing, wherein a first section of the electronics housing is arranged on a radial side of the stator housing, the electronics housing extending in an axial direction beyond the stator housing axial end, the axial direction being parallel to the longitudinal axis of the stator housing, wherein an extension of the electronics housing forms a second section of the electronics housing;
   at least one first heat-producing electronic component, wherein the at least one first heat-producing electronic component is a rectifier and/or an inverter of a frequency converter arranged inside the second section of the electronics housing, the at least one first heat producing electronic component producing the most heat in the inside of the electronics housing;
   a plurality of second heat producing components, wherein the plurality of second heat producing components are arranged inside the first section of the electronics housing, which first section does not house the at least one first heat producing electronic component, wherein each of the second heat producing components comprises lower heat producing components, which lower heat producing components produce less heat than the at least one first heat producing electronic component; and
   a fan arranged on the stator housing axial end, the second section being situated on a radial side of the fan, wherein the at least one first heat-producing electronic component inside the second section of the electronics housing is in thermal contact with an inner side of the first wall section directly adjacent to the fan and above the fan such that the at least one first heat-producing electronic component is located at a position beyond the stator housing axial end, the fan generating a flow of fluid radially directed toward the second section.

2. An electric motor according to claim 1, wherein cooling ribs which extend in the peripheral direction with respect to the rotation axis of the electric motor, are formed on the outer side of said first wall section facing the fan, on the second wall section of the electronics housing which is arranged on the radial side of the fan, the first wall section comprising an inner surface, the at least one first heat-producing electronic component being in direct contact with the inner surface, wherein the at least one first heat-producing electronic component is in direct thermal contact with the inner surface.

3. An electric motor according to claim 1, wherein a pocket is recessed in the second section of the electronics housing, in the inside of which pocket a heat-producing electronic component is arranged, and is arranged in a manner such that a tangentially directed cooling airflow flows onto the pocket on an outer side.

4. An electric motor according to claim 1, wherein the first wall section of the electronics housing which faces the fan and the second wall section of the electronics housing which faces the stator housing are manufactured of one piece, the at least one first heat-producing electronic component directly facing the inner side of the first wall section.

5. An electric motor according to claim 1, wherein an electromagnetic shielding is arranged in the inside of the electronics housing between two regions of the interior, the at least one first heat-producing electronic component being supported by bearing-contact surfaces of the inner side of the first wall section.

6. An electric motor according to claim 1, wherein mechanical and/or electronic connection elements are arranged between the stator housing and the electronics housing in a manner such that they are situated laterally of a cooling airflow between the stator housing and the electronics housing.

7. A pump assembly with a drive motor, wherein the drive motor is an electric motor according to claim 1.

8. An electric motor according to claim 1, wherein a cooling airflow produced by the fan flows over the second section of the electronics housing on an outer side thereof, in the tangential direction.

9. An electric motor according to claim 8, wherein a first part airflow of the cooling airflow produced by the fan flows over an outer side of the second section of the electronics housing, and a second part airflow flows over an outer side of the first section of the electronics housing.

10. An electric motor according to claim 1, wherein said electronics housing comprises said first wall section and a second wall section, said first wall section and said second wall section defining a lower wall of said electronics housing, wherein a ribbing directed towards the fan extends from an outer side of said first wall section facing the fan, on the second section of the electronics housing which is arranged on the radial side of the fan, wherein the first section of the electronics housing on an outer side of said second wall section facing a peripheral surface of the stator housing comprises cooling ribs which extend parallel to a rotation axis of the electric motor.

11. An electric motor according to claim 10, wherein said ribbing is perpendicular to said cooling ribs.

12. An electric motor according to claim 1, wherein a ribbing directed towards the fan is formed on the outer side of said first wall section facing the fan, on the second section of the electronics housing which is arranged on the radial side of the fan.

13. An electric motor according to claim 12, wherein the first section of the electronics housing on the outer side of said second wall section facing the peripheral surface of the stator housing comprises cooling ribs which extend parallel to the rotation axis of the electric motor.

14. An electric motor according to claim 13, further comprising at least one second heat-producing electronic component arranged on an inner side of the second wall section facing the stator housing, in the first section of the electronics housing.

15. An electric motor according to claim 13, wherein at least the first wall section of the electronics housing which faces the fan and/or the second wall section of the electronics housing which faces the stator housing, are manufactured of metal.

16. An electric motor comprising:
a stator housing;
an electronics housing comprising a lower wall, said lower wall defining at least a portion of an interior space of said electronic housing, said lower wall comprising a first wall section and a second wall section, said first wall section being arranged on a radial side of the stator housing;
a heat-producing electronic component comprising a rectifier and/or an inverter of a frequency converter;
a fan arranged on an axial end of the stator housing, wherein the second wall section comprises an axial extent located beyond the axial end of the stator housing, the axial extent extending in an axial direction relative to a longitudinal axis of said fan, said fan being arranged on the axial end of the stator housing, said second wall section being arranged on a radial side of the fan, wherein airflow is directed to pass over said second wall section prior to passing over said first wall section, the heat-producing electronic component being arranged in said interior space of the electronics housing, wherein the heat-producing electronic component is arranged directly opposite an inner side of said axial extent, at least a portion of the airflow being directed in a radial direction toward said axial extent with respect to said longitudinal axis, said heat-producing electronic component being located above said fan wherein the heat-producing electronic component produces the most heat in the interior space of the electronics housing and the heat-producing electronic component is thermally connected to the second wall section; and
a plurality of other heat producing components, the plurality of other heat producing components being arranged inside the first wall section of the electronics housing, the first wall section not housing the heat-producing electronic component, each of the other heat producing electronic components producing less heat than the heat producing electronic component.

17. An electric motor according to claim 16, further comprising:
a plurality of first cooling ribs directed towards the fan, said first cooling ribs extending from an outer side of said second wall section, wherein the first section wall section faces a peripheral surface of the stator housing;
a plurality of second cooling ribs extending from an outer side of said first wall section, said second cooling ribs extending parallel to a rotation axis of the electric motor, said first cooling ribs being perpendicular to said second cooling ribs, said heat-producing component being located opposite said fan, the heat-producing electronic component directly facing the inner side of the second wall section, the heat-producing electronic component being in direct contact with contact-bearing surfaces of the second wall section, wherein the heat-producing electronic component is in direct thermal contact with the contact-bearing surfaces.

18. An electric motor according to claim 16, wherein the fan comprises fan blades, the heat-producing electronic component being located above the fan blades in a radial direction relative to the longitudinal axis, the heat-producing element being located at a position located beyond the stator housing in the axial direction, the axial direction being parallel to the longitudinal axis, the fan blades being arranged between one end of the axial extent and another end of the axial extent.

19. An electric motor comprising:
a stator housing;
an electronics housing comprising an upper wall and a lower wall, said lower wall being arranged between said stator housing and said upper wall, said lower wall comprising a first wall section and a second wall section, said first wall section being arranged on a radial side of the stator housing, said first wall facing in a direction of said stator housing;
a heat-producing electronic component;
a fan arranged on an axial end of the stator housing, wherein the second wall section extends in an axial direction beyond the axial end of the stator housing with respect to a longitudinal axis of the stator housing, said fan being arranged on the axial end of the stator housing, said second wall section facing in a direction of said fan, wherein said fan is located radially opposite said second wall section with respect to said longitudinal axis, said fan generating a flow of fluid directed in a radial direction toward said second wall section with respect to said longitudinal axis, said heat-producing electronic component being in thermal contact with the second wall section, wherein the heat-producing electronic component is arranged on a radial side of the fan with respect to said longitudinal axis, the heat-producing component being located in a position beyond the axial end of the stator housing in the axial direction, the axial direction being parallel to the longitudinal axis of the stator housing;
a plurality of first cooling ribs extending from said first wall section, wherein said first cooling ribs are located opposite said stator housing, said first cooling ribs extending in said axial direction;
a plurality of second cooling ribs extending from said second wall section, said second cooling ribs being located opposite said fan, said second cooling ribs extending in a circumferential direction of the fan transverse to the axial direction, each of said second cooling ribs extending from one side of the electronics housing to another side of the electronics housing.

20. An electric motor according to claim 19, wherein the heat-producing electronic component is arranged directly opposite an inner side of said second wall section, said heat-producing electronic component directly facing said inner side of said second wall, said heat-producing electronic component being in direct contact with contact-bearing surfaces on said inner side of said second wall, wherein said heat-producing electronic component is in direct thermal contact with the contact-bearing surfaces, wherein the heat-producing electronic component produces the most heat in an interior space of the electronics housing, said first direction being perpendicular to said second direction, the heat-producing electronic comprising a rectifier and/or an inverter of a frequency converter, wherein the plurality of second cooling ribs and the electronics housing are the only structures separating the heat-producing electronic component from the fan.

\* \* \* \* \*